US011132544B2

(12) United States Patent
Sun et al.

(10) Patent No.: US 11,132,544 B2
(45) Date of Patent: Sep. 28, 2021

(54) VISUAL FATIGUE RECOGNITION METHOD, VISUAL FATIGUE RECOGNITION DEVICE, VIRTUAL REALITY APPARATUS AND STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiankang Sun, Beijing (CN); Hao Zhang, Beijing (CN); Lili Chen, Beijing (CN); Minglei Chu, Beijing (CN); Hongzhen Xue, Beijing (CN); Guixin Yan, Beijing (CN); Xi Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 45 days.

(21) Appl. No.: 16/612,996

(22) PCT Filed: Apr. 23, 2019

(86) PCT No.: PCT/CN2019/083902
§ 371 (c)(1),
(2) Date: Nov. 12, 2019

(87) PCT Pub. No.: WO2019/206145
PCT Pub. Date: Oct. 31, 2019

(65) Prior Publication Data
US 2021/0042497 A1 Feb. 11, 2021

(30) Foreign Application Priority Data
Apr. 26, 2018 (CN) .......................... 201810384239.1

(51) Int. Cl.
G06K 9/00 (2006.01)
G06K 9/62 (2006.01)
(Continued)

(52) U.S. Cl.
CPC ......... *G06K 9/0061* (2013.01); *G06K 9/6201* (2013.01); *G06T 5/002* (2013.01); *G06T 5/007* (2013.01); *G08B 21/18* (2013.01)

(58) Field of Classification Search
CPC ......... G06T 5/002; G06T 5/007; G08B 21/18; G08B 21/24
See application file for complete search history.

(56) References Cited

U.S. PATENT DOCUMENTS

2015/0269892 A1   9/2015  Yang et al.
2017/0111789 A1*  4/2017  Tang .................... G06K 9/40

FOREIGN PATENT DOCUMENTS

CN    103186609 A    7/2013
CN    103903583 A    7/2014
(Continued)

OTHER PUBLICATIONS

Zheng et al., "Advances in Research on driving safety eye movement based on visual characteristics", Technology and Innovation Management, vol. 39, Issue 1, Jan. 31, 2018, pp. 51-59 with English translation (20 pages).
(Continued)

Primary Examiner — Matthew C Bella
Assistant Examiner — Kathleen M Broughton
(74) Attorney, Agent, or Firm — Collard & Roe, P.C.

(57) ABSTRACT

A visual fatigue recognition method, a visual fatigue recognition device, a virtual reality apparatus and a storage medium. The visual fatigue recognition method includes acquiring an eye image of a user; acquiring a visual feature from the eye image, and calculating a visual fatigue value
(Continued)

according to the visual features according to the visual feature a visual fatigue value; comparing the visual fatigue value with a fatigue grade threshold values and determining a the visual fatigue grade based on the comparison result; and allowing the visual fatigue grade to be used to generate a corresponding alert signal. The visual fatigue recognition method helps to protect the user's eyesight.

13 Claims, 5 Drawing Sheets

(51) Int. Cl.
    *G06T 5/00*         (2006.01)
    *G08B 21/18*     (2006.01)

(56)              References Cited

FOREIGN PATENT DOCUMENTS

| CN | 104240446 A | * | 12/2014 |
|---|---|---|---|
| CN | 204065594 U | * | 12/2014 |
| CN | 102846324 B | * | 1/2015 |
| CN | 105513280 A | | 4/2016 |
| CN | 106073805 A | * | 11/2016 |
| CN | 106168854 A | | 11/2016 |
| CN | 107341468 A | | 11/2017 |
| CN | 107463254 A | | 12/2017 |
| CN | 107562213 A | * | 1/2018 |
| CN | 107562213 A | | 1/2018 |
| CN | 107645590 A | | 1/2018 |
| CN | 207207753 U | * | 4/2018 |
| CN | 108596106 A | | 9/2018 |
| WO | 2017/101226 A1 | | 6/2017 |

OTHER PUBLICATIONS

International Search Report of PCT/CN2019/083902 in Chinese, dated Jul. 30, 2019, with English translation.
Chinese Office Action in Chinese Application No. 201810384239.1, dated Dec. 27, 2019 with English translation.

* cited by examiner

VISUAL FATIGUE RECOGNITION METHOD, VISUAL FATIGUE RECOGNITION DEVICE, VIRTUAL REALITY APPARATUS AND STORAGE MEDIUM

CROSS REFERENCE TO RELATED APPLICATIONS

This application is the National Stage of PCT/CN2019/083902 filed on Apr. 23, 2019, which claims priority under 35 U.S.C. § 119 of Chinese Application No. 201810384239.1 filed on Apr. 26, 2018, the disclosure of which is incorporated by reference.

TECHNICAL FIELD

Embodiments of the present disclosure relates to a visual fatigue recognition method, a visual fatigue recognition device, a virtual reality apparatus and a storage medium.

BACKGROUND

Virtual Reality (abbreviated as VR) technology is a computer simulation technology which can create and experience virtual worlds. The VR technology combines computer technology and display technology to construct a virtual environment which allows users to be immersed into the virtual environment and have a strong feeling of immersion.

A virtual reality (VR) apparatus is generally head-mounted, which can be applied to fields such as electronic games and video interactions and the like, but the head-mounted virtual reality apparatus is generally used in a gloomy and relatively closed environment. When the VR apparatus is worn, in general a distance from the watched display screen is relatively close, and when an image displayed on the display screen is observed by a user through the VR apparatus, there can be problems such as image distortion and too large parallax of the two eyes, and thus the user may feel visual fatigue when using the virtual reality apparatus.

SUMMARY

Some embodiments of the present disclosure provide a visual fatigue recognition method, comprising: acquiring an eye image of a user; acquiring visual features from the eye image, and calculating a visual fatigue value according to the visual features; comparing the visual fatigue value with fatigue grade threshold values and determining a visual fatigue grade according to the comparison result; and allowing the visual fatigue grade to be used to generate a corresponding alert signal.

In some examples, the method further comprises: pre-processing the eye image before acquiring the visual features from the eye image. The pre-processing the eye image comprises increasing brightness of the eye image, increasing contrast of the eye image, and/or performing a denoising process on the eye image.

In some examples, the visual features comprise: a mean velocity of pupil motion, a mean angular velocity of pupil motion, a mean time duration of closing eyes and/or a mean blink frequency.

In some examples, the acquiring visual features from the eye image comprises: acquiring pupil positions, pupil areas, and/or blink counts from successive frames of eye images, respectively; and then corresponding with the visual features, calculating the mean velocity of pupil motion according to each of the pupil positions within a first preset time period; calculating the mean angular velocity of pupil motion according to each of the pupil positions within a second preset time period; calculating the mean time duration of closing eyes according to each of the pupil areas within a third preset time period; and/or calculating the mean blink frequency according to the blink counts within a fourth preset time period.

In some examples, corresponding with acquiring the visual feature, the calculating the visual fatigue value according to the visual features comprises: acquiring a first visual fatigue value by comparing the mean velocity of pupil motion with mean velocity grade threshold values of pupil motion, acquiring a second visual fatigue value by comparing the mean angular velocity of pupil motion with mean angular velocity grade threshold values of pupil motion, acquiring a third visual fatigue value by comparing the mean time duration of closing eyes with mean time duration grade threshold values of closing eyes, and/or acquiring a fourth visual fatigue value by comparing the mean blink frequency with grade threshold values of a mean blink frequency.

In some examples, the mean velocity grade threshold values of pupil motion comprise a mild fatigue threshold value of the mean velocity of pupil motion, a moderate fatigue threshold value of the mean velocity of pupil motion, and a severe fatigue threshold value of the mean velocity of pupil motion; the mean angular velocity grade threshold values of pupil motion comprise a mild fatigue threshold value of the mean angular velocity of pupil motion, a moderate fatigue threshold value of the mean angular velocity of pupil motion, and a severe fatigue threshold value of the mean angular velocity of pupil motion; the mean time duration grade threshold values of closing eyes comprise a mild fatigue threshold value of the mean time duration of closing eyes, a moderate fatigue threshold value of the mean time duration of closing eyes, and a severe fatigue threshold value of the mean time duration of closing eyes; the grade threshold values of the mean blink frequency comprise a mild fatigue threshold value of the mean blink frequency, a moderate fatigue threshold value of the mean blink frequency, and a severe fatigue threshold value of the mean blink frequency; the acquiring the first visual fatigue value by comparing the mean velocity of pupil motion with the mean velocity grade threshold values of pupil motion comprises: assigning a first velocity numerical value to the first visual fatigue value assigning a first velocity numerical value to the first visual fatigue value in a case where the mean velocity of pupil motion is less than the mild fatigue threshold value of the mean velocity of pupil motion, assigning a second velocity numerical value to the first visual fatigue value in a case where the mean velocity of pupil motion is greater than the moderate fatigue threshold value of the mean velocity of pupil motion and less than the mild fatigue threshold value of the mean velocity of pupil motion, assigning a third velocity numerical value to the first visual fatigue value in a case where the mean velocity of pupil motion is greater than the moderate fatigue threshold value of the mean velocity of pupil motion and less than the severe fatigue threshold value of the mean velocity of pupil motion, assigning a fourth velocity numerical value to the first visual fatigue value in a case where the mean velocity of pupil motion is greater than the severe fatigue threshold value of the mean velocity of pupil motion, wherein the mild fatigue threshold value of the mean velocity of pupil motion is less than the moderate fatigue threshold value of the mean velocity of pupil motion, and the moderate fatigue threshold value of the mean velocity of pupil motion is less than the severe fatigue threshold value of the mean velocity of pupil motion; the acquiring the second visual fatigue value by comparing the mean angular velocity of pupil motion with the mean angular velocity threshold values of pupil motion comprises: assigning a first angular velocity numerical value to the second visual fatigue value in a case where the mean angular velocity of pupil motion is less than the mild fatigue threshold value of the mean angular velocity of pupil motion, assigning a second angular velocity numerical value to the second visual fatigue value in a case where the mean angular velocity of pupil motion is greater than the mild fatigue threshold value of the mean angular velocity of pupil motion and less than the moderate fatigue threshold value of the mean angular velocity of pupil motion, assigning a third angular velocity numerical value to the second visual fatigue value in a case where the mean angular velocity of pupil motion is greater than the moderate fatigue threshold value of the mean angular velocity of pupil motion and less than the severe fatigue threshold value of the mean angular velocity of pupil motion, assigning a fourth angular velocity numerical value to the second visual fatigue value in a case where the mean angular velocity of pupil motion is greater than the severe fatigue threshold value of the mean angular velocity of pupil motion, wherein the threshold value of mild fatigue of the mean angular velocity of pupil motion is less than the threshold value of moderate fatigue of the mean angular velocity of pupil motion, and the threshold value of moderate fatigue of the mean angular velocity of pupil motion is less than the threshold value of severe fatigue of the mean angular velocity of pupil motion; the acquiring the third visual fatigue value by comparing the mean time duration of closing eyes with the mean time duration grade threshold values of closing eyes comprises: assigning a first time numerical value to the third visual fatigue value in a case where the mean time duration of closing eyes is less than the mild fatigue threshold value of the mean time duration of closing eyes, assigning a second time numerical value to the third visual fatigue value in a case where the mean time duration of closing eyes is greater than the mild fatigue threshold value of the mean time duration of closing eyes and less than the moderate fatigue threshold value of the mean time duration of closing eyes, assigning a third time numerical value to the third visual fatigue value in a case where the mean time duration of closing eyes is greater than the moderate fatigue threshold value of the mean time duration of closing eyes and less than the severe fatigue threshold value of the mean time duration of closing eyes, assigning a fourth time numerical value to the third visual fatigue, value in a case where the mean time duration of closing eyes is greater than the severe fatigue threshold value of the mean time duration of closing eyes, wherein the mild fatigue threshold value of the mean time duration of closing eyes is less than the moderate fatigue threshold value of the mean time duration of closing eyes, and the moderate fatigue threshold value of the mean time duration of closing eyes is less than the severe fatigue threshold value of the mean time duration of closing eyes; the acquiring the fourth visual fatigue value by comparing the mean blink frequency with grade threshold values of the mean blink frequency comprises: assigning a first frequency numerical value to the fourth visual fatigue value in a case where the mean blink frequency is less than the mild fatigue threshold value of the mean blink frequency, assigning a second frequency numerical value to the fourth visual fatigue value in a case where the mean blink frequency is greater than the mild fatigue threshold value of the mean blink frequency and less than the moderate fatigue threshold value of the mean blink frequency, assigning a third frequency numerical value to the fourth visual fatigue value in a case where the mean blink frequency is greater than the moderate fatigue threshold value of the mean blink frequency and less than the severe fatigue threshold value of the mean blink frequency, assigning a fourth frequency numerical value to the fourth visual fatigue value in a case where the mean blink frequency is greater than the severe fatigue threshold value of the mean blink frequency, wherein the mild fatigue threshold value of the mean blink frequency is less than the moderate fatigue threshold value of the mean blink frequency, and the moderate fatigue threshold value of the mean blink frequency is less than the severe fatigue threshold value of the mean blink frequency.

In some examples, the calculating the visual fatigue value according to the visual features further comprises: determining the visual fatigue value according to the first visual fatigue value, the second visual fatigue value, the third visual fatigue value, and/or the fourth visual fatigue value.

In some examples, the fatigue grade threshold values comprise a mild fatigue threshold value, a moderate fatigue threshold value, and a severe fatigue threshold value; and comparing the visual fatigue value with fatigue grade threshold values and determining the visual fatigue grade according to the comparison result comprises: determining the visual fatigue grade to be a mild fatigue grade in a case where the visual fatigue value is greater than or equal to the mild fatigue threshold value and less than the moderate fatigue threshold value; determining the visual fatigue grade to be a moderate fatigue grade in a case where the visual fatigue value is greater than or equal to the moderate fatigue threshold value and less than the severe fatigue threshold value; determining the visual fatigue grade to be severe fatigue grade in a case where the visual fatigue value is greater than or equal to the severe fatigue threshold value.

In some examples, the method further comprises generating the corresponding alert signal according to the visual fatigue grade, wherein the generating the corresponding alert signal based on the visual fatigue grade comprises: generating an image flashing signal of a corresponding color and/or a vibration signal of a corresponding frequency according to the visual fatigue grade, so that a screen of a virtual reality apparatus displays an image of the corresponding color which flashes at a first preset frequency and/or, the virtual reality apparatus vibrates at a second preset frequency.

In some examples, the method is applied in a virtual reality apparatus.

Some embodiments of the present disclosure further provide a visual fatigue recognition device comprising: an eye image acquisition unit configured to acquire an eye image of a user; a visual fatigue value acquisition unit configured to acquire visual features from the eye image and to calculate a visual fatigue value according to the visual features; a visual fatigue grade determination unit configured to compare the visual fatigue value with fatigue grade threshold values and to determine a visual fatigue grade according to the comparison result.

In some examples, the device further comprises an alert signal generation unit configured to generate a corresponding alert signal according to the visual fatigue grade.

In some examples, the device further comprises an image pre-processing unit, and the image pre-processing unit comprises a brightness increase unit, a contrast increase unit, and/or a filtering unit; the brightness increase unit is configured to increase brightness of the eye image; the contrast increase unit is configured to increase contrast of the eye image; and the filtering unit is configured to perform a denoising process on the eye image.

In some examples, the visual features comprise a mean velocity of pupil motion, a mean angular velocity of pupil motion, a mean time duration of closing eyes, and/or a mean blink frequency; correspondingly, the visual fatigue value acquisition unit comprises: a visual feature acquisition sub-unit configured to respectively acquire pupil positions, pupil areas, and/or blink counts from successive frames of eye images; a mean velocity of pupil motion calculation sub-unit configured to calculate the mean velocity of pupil motion according to each of the pupil positions in a first preset time period; a mean angular velocity of pupil motion calculation sub-unit configured to calculate the mean angular velocity of pupil motion according to each of the pupil positions in a second preset time period; a mean time duration of closing eyes calculation sub-unit configured to calculate the mean time duration of closing eyes according to each of the pupil areas in a third preset time period; and/or a mean blink frequency calculation sub-unit configured to calculate the mean time duration of closing eyes according to the blink counts in a fourth preset time period.

In some examples, the visual fatigue value acquisition unit further comprises a first visual fatigue value determination sub-unit, a second visual fatigue value determination sub-unit, a third visual fatigue value determination sub-unit and/or a fourth visual fatigue value determination sub-unit, and further a visual fatigue value determination sub-unit; the first visual fatigue value determination sub-unit is configured to acquire a first visual fatigue value by comparing the mean velocity of pupil motion with mean velocity grade threshold values of pupil motion; the second visual fatigue value determination sub-unit configured to acquire a second visual fatigue value by comparing the mean angular velocity of pupil motion with mean angular velocity threshold values of pupil motion; the third visual fatigue value determination sub-unit is configured to acquire a third visual fatigue value by comparing the mean time duration of closing eyes with mean time duration grade threshold values of closing eyes; the fourth visual fatigue value determination sub-unit is configured to acquire a fourth visual fatigue value by comparing the mean blink frequency with grade threshold values of the mean blink frequency; the visual fatigue value determination sub-unit is configured to determine the visual fatigue value according to the first visual fatigue value, the second visual fatigue value, the third visual fatigue value, and/or the fourth visual fatigue value.

In some examples, the mean velocity grade threshold values of pupil motion comprise a mild fatigue threshold value of the mean velocity of pupil motion, a moderate fatigue threshold value of the mean velocity of pupil motion, and a severe fatigue threshold value of the mean velocity of pupil motion; the mean angular velocity grade threshold values of pupil motion comprise a mild fatigue threshold value of the mean angular velocity of pupil motion, a moderate fatigue threshold value of the mean angular velocity of pupil motion, and a severe fatigue threshold value of the mean angular velocity of pupil motion; the mean time duration grade threshold values of closing eyes comprise a mild fatigue threshold value of the mean time duration of closing eyes, a moderate fatigue threshold value of the mean time duration of closing eyes, and a severe fatigue threshold value of the mean time duration of closing eyes; the grade threshold values of the mean blink frequency comprise a mild fatigue threshold value of the mean blink frequency, a moderate fatigue threshold value of the mean blink frequency, and a severe fatigue threshold value of the mean blink frequency; the first visual fatigue value determination sub-unit is configured to assign a first velocity numerical value to the first visual fatigue value in a case where the mean velocity of pupil motion is less than the mild fatigue threshold value of the mean velocity of pupil motion, to assign a second velocity numerical value to the first visual fatigue value in a case where the mean velocity of pupil motion is greater than the moderate fatigue threshold value of the mean velocity of pupil motion and less than the mild fatigue threshold value of the mean velocity of pupil motion, to assign a third velocity numerical value to the first visual fatigue value in a case where the mean velocity of pupil motion is greater than the moderate fatigue threshold value of the mean velocity of pupil motion and less than the severe fatigue threshold value of the mean velocity of pupil motion, and further to assign a fourth velocity numerical value to the first visual fatigue value in a case where the mean velocity of pupil motion is greater than the severe fatigue threshold value of the mean velocity of pupil motion, wherein the mild fatigue threshold value of the mean velocity of pupil motion is less than the moderate fatigue threshold value of the mean velocity of pupil motion, and the moderate fatigue threshold value of the mean velocity of pupil motion is less than the severe fatigue threshold value of the mean velocity of pupil; the second visual fatigue value determination sub-unit is configured to assign a first angular velocity numerical value to the second visual fatigue value in a case where the mean angular velocity of pupil motion is less than the mild fatigue threshold value of the mean angular velocity of pupil motion, to assign a second angular velocity numerical value to the second visual fatigue value in a case where the mean angular velocity of pupil motion is greater than the mild fatigue threshold value of the mean angular velocity of pupil motion and less than the moderate fatigue threshold value of the mean angular velocity of pupil motion, to assign a third angular velocity numerical value to the second visual fatigue value in a case where the mean angular velocity of pupil motion is greater than the moderate fatigue threshold value of the mean angular velocity of pupil motion and less than the severe fatigue threshold value of the mean angular velocity of pupil motion, and further to assign a fourth angular velocity numerical value to the second visual fatigue value in a case where the mean angular velocity of pupil motion is greater than the severe fatigue threshold value of the mean angular velocity of pupil motion, wherein the threshold value of mild fatigue of the mean angular velocity of pupil motion is less than the threshold value of moderate fatigue of the mean angular velocity of pupil motion, and the threshold value of moderate fatigue of the mean angular velocity of pupil motion is less than the threshold value of severe fatigue of the mean angular velocity of pupil motion; the third visual fatigue value determination sub-unit is configured to assign a first time numerical value to the third visual fatigue value in a case where the mean time duration of closing eyes is less than the mild fatigue threshold value of the mean time duration of closing eyes, to assign a second time numerical value to the third visual fatigue value in a case where the mean time duration of closing eyes is greater than the mild fatigue threshold value of the mean time duration of closing eyes and less than the moderate fatigue threshold value of the mean time duration of closing eyes, to assign a third time numerical value to the third visual fatigue value in a case where the mean time duration of closing eyes is greater than the moderate fatigue threshold value of the mean time duration of closing eyes and less than the severe fatigue threshold value of the mean time duration of closing eyes, and further to assign a fourth time numerical value to the third visual fatigue value in a case where the mean time duration of closing eyes is greater than the severe fatigue threshold value of the mean time duration of closing eyes, wherein the mild fatigue threshold value of the mean time duration of closing eyes is less than the moderate fatigue threshold value of the mean time duration of closing eyes, and the moderate fatigue threshold value of the mean time duration of closing eyes is less than the severe fatigue threshold value of the mean time duration of closing eyes; the fourth visual fatigue value determination sub-unit is configured to assign a first frequency numerical value to the fourth visual fatigue value in a case where the mean blink frequency is less than the mild fatigue threshold value of the mean blink frequency, to assign a second frequency numerical value to the fourth visual fatigue value in a case where the mean blink frequency is greater than the mild fatigue threshold value of the mean blink frequency and less than the moderate fatigue threshold value of the mean blink frequency, to assign a third frequency numerical value to the fourth visual fatigue value in a case where the mean blink frequency is greater than the moderate fatigue threshold value of the mean blink frequency and less than the severe fatigue threshold value of the mean blink frequency, and further to assign a fourth frequency numerical value to the fourth visual fatigue value in a case where the mean blink frequency is greater than the severe fatigue threshold value of the mean blink frequency, wherein the mild fatigue threshold value of the mean blink frequency is less than the moderate fatigue threshold value of the mean blink frequency, and the moderate fatigue threshold value of the mean blink frequency is less than the severe fatigue threshold value of the mean blink frequency.

In some examples, the fatigue grade threshold values comprise a mild fatigue threshold value, a moderate fatigue threshold value, and a severe fatigue threshold value, the visual fatigue grade determination unit is configured to determine the visual fatigue grade to be a mild fatigue grade in a case where the visual fatigue value is greater than or equal to the mild fatigue threshold value and less than the moderate fatigue threshold value; to determine the visual fatigue grade to be a moderate fatigue grade in a case where the visual fatigue value is greater than or equal to the moderate fatigue threshold value and less than the severe fatigue threshold value; and further to determine the visual fatigue grade to be severe fatigue grade in a case where the visual fatigue value is greater than or equal to the severe fatigue threshold value.

Some embodiments of the present disclosure further provide a virtual reality apparatus comprising the above visual fatigue recognition device.

Some embodiments of the present disclosure further provide another virtual reality apparatus comprising a processor and a machine-readable storage medium. The machine-readable storage medium stores machine-executable instructions suitable for being executed by the processor, and the above visual fatigue recognition method is executed in a case where the machine-executable instructions are executed by the processor.

Some embodiments of the present disclosure further provide a storage medium, non-transitorily storing computer readable instructions. The above visual fatigue recognition method is performed in a case where the non-transitory computer readable instructions are executed by a computer.

DESCRIPTION OF THE EMBODIMENTS

In order to more clearly illustrate technical solutions of embodiments of the present invention, the drawings of the embodiments will be briefly introduced below. It is obvious that the drawings in the following description only relate to some embodiments of the present invention, but embodiments of the present disclosure are not limited thereto.

Figure 1:
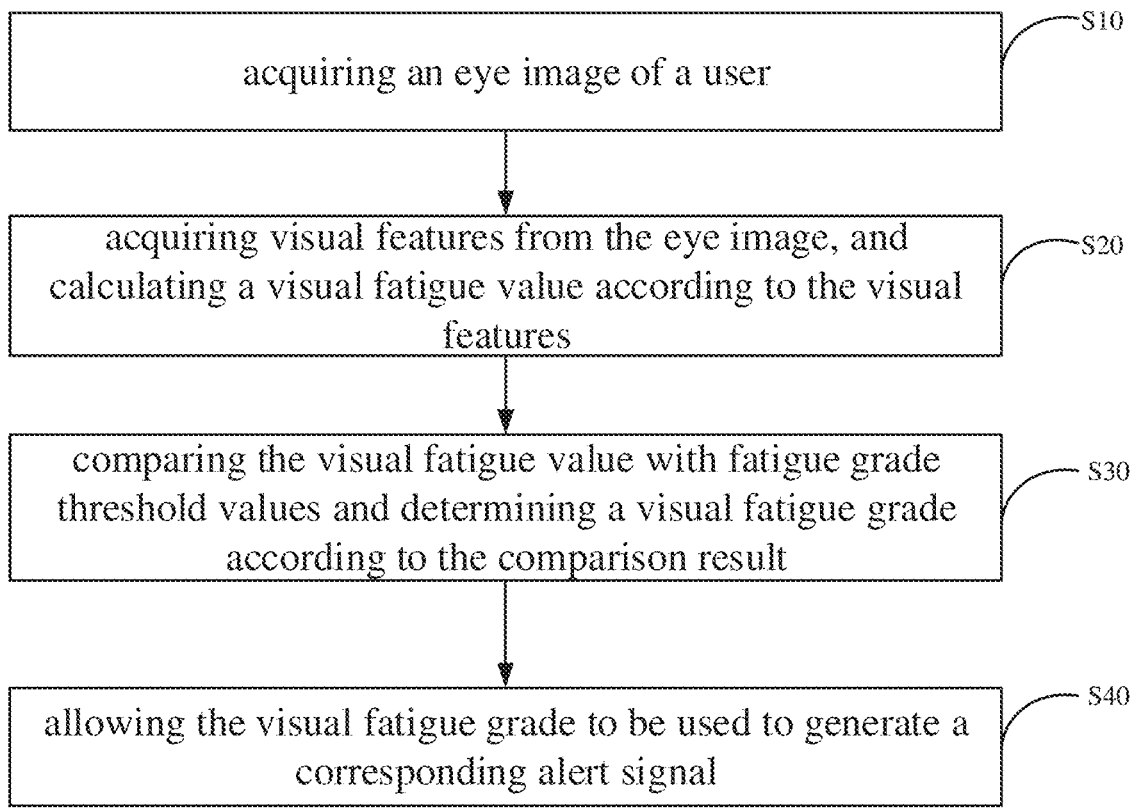
FIG. 1 is a workflow chart of a visual fatigue recognition method provided by some embodiments of the present disclosure.

An embodiment of the present disclosure provides a visual fatigue recognition method. As shown in FIG. 1, the method includes: Step S10 for acquiring an eye image of a user; Step S20 for acquiring visual features from the eye image, and calculating a visual fatigue value according to the visual features; Step S30 for comparing the visual fatigue value with the fatigue grade threshold values and determining a visual fatigue grade according to the comparison result; and Step S40 for allowing the visual fatigue grade to be used to generate a corresponding alert signal.

The method is specifically illustrated below, by taking the application of the method to a virtual reality VR apparatus as an example; however, application scenarios of this method is not limited to the embodiments of the present disclosure.

A virtual reality (VR) apparatus, in view from hardware, may include a modeling component (e.g., a 3D scanner), a three-dimensional visual display component (e.g., a 3D demonstration device, a projection device, etc.), a head-mounted stereoscopic displayer (e.g., a Binocular Omni-Orientation Monitor), a sounding component (e.g., a three-dimensional audio device), an interaction apparatus (e.g., including a position tracker, a data glove, etc.), 3D input apparatus (e.g., a three-dimensional mouse), a motion capture apparatus, and other interaction apparatuses.

In some examples, the VR apparatus may further include an image capture device, for example, including an infrared light source and an infrared camera, and the infrared camera may be disposed below the lens in the three-dimensional visual display component of the VR apparatus. The infrared light source may be supplemental lighting to the eyes, and then the infrared camera is used to acquire the eye image, which can help to acquire detailed information of the eye image, especially detailed information of a pupil part image. The image capture device can also be disposed independently from the VR apparatus.

The eye image may include both a left eye image and a right eye image, or either only the left eye image or the right eye image. Since the states of two human eyes are in general the same or similar, the state of human eyes can be judged by the image of one eye.

In some examples, a deep learning-based image recognition algorithm can be employed to extract visual features from the eye image, the visual features for example including a velocity of pupil motion, an angular velocity of pupil motion, a time duration of closing eyes and/or a blink frequency, etc., the visual fatigue value can be calculated according to the visual features, the visual fatigue value is used to indicate a grade of fatigue of the human eyes, and a greater visual fatigue value indicates a higher grade of fatigue of the human eyes. For example, in a case where the blink frequency is low and the time induration of closing eyes is long, and the calculated visual fatigue value is larger, it may be considered that the human eyes of the user are in a relatively more fatigue state.

For example, the visual fatigue value is compared with fatigue grade threshold values, and a visual fatigue grade is further determined according to the comparison result. The visual fatigue grade is determined according to the grades of fatigue of the human eyes, and the visual fatigue grade may include, for example, a mild fatigue grade, a moderate fatigue grade and a severe fatigue grade, etc.

For example, the fatigue grade threshold values include a mild fatigue threshold value, a moderate fatigue threshold value, and a severe fatigue threshold value. For example, the mild fatigue threshold value, the moderate fatigue threshold value, and the severe fatigue threshold value respectively correspond to a grademild fatigue grade, a grademoderate fatigue grade, and a gradesevere fatigue grade.

For example, the visual fatigue grade may be determined according to the comparison result between the visual fatigue value and the fatigue grade threshold values, and the fatigue grade threshold values may be reference values for judging the grade of visual fatigue. For example, in a case where the visual fatigue value is greater than a fatigue grade threshold value corresponding to a mild fatigue state (such as the mild fatigue threshold value), it can be decided the human eyes of the user are in a mild fatigue state; in a case where the visual fatigue value is greater than the fatigue grade threshold value corresponding to a moderate fatigue such as the moderate fatigue threshold value), it can be decided the human eyes of the user are in a moderate fatigue state; in a case where the fatigue value is greater than a fatigue grade threshold value corresponding to a severe fatigue state (such as the threshold severe fatigue value), it can be decided the human eyes of the user are in a severe fatigue state. For example, the visual fatigue grade is used to generate a corresponding alert signal for alerting the user of the grade of visual fatigue in which the user is, and so that the user can take an appropriate rest according to the alert signal, which helps to relieve fatigue of human eyes. The alert signal can be of various forms, for example, an alarm voice emitted by utilizing a speaker in the VR apparatus, or an alert image displayed by the display of the VR apparatus, or a vibration of a controlled VR apparatus, or the like.

It can be seen from the above description that the visual fatigue recognition method based on the VR apparatus may calculate the visual fatigue value according to the visual features extracted from the eye image, compare the visual fatigue value with the fatigue grade threshold values to determine the the visual fatigue grade, then determine the visual fatigue grade according to the comparison result, and allow the visual fatigue grade to be used to generate a corresponding alert signal to alert the user of the fatigue grade of human eyes, so that the user can be informed of the current fatigue grade of human eyes, and thus take an appropriate rest to reduce risk of problems such as myopia, which helps to protect the user's eyesight.

In order to improve the image quality of the acquired eye image, a pre-process may be performed on the acquired original eye image before the visual feature is acquired from the eye image. For example, the pre-process may include one or more of the following processes: increasing brightness of the eye image, increasing contrast of the eye image, performing a denoising process on the eye image.

In some examples, the brightness and contrast of the eye image may be improved by an image processing algorithm, such as a grey-level transformation method or a histogram adjustment method. Moreover, because the acquired original eye image generally has certain noises, in order to further improve the quality of the eye image, the noises in the eye image can be removed by a further filtering process on the eye image using a filtering algorithm, which helps to extract the visual features from the eye image of a high quality.

In some examples, the visual features may include a velocity of pupil motion, a angular velocity of pupil motion, a time duration of closing eyes and/or a blink frequency. The extracting the visual features from the eye image as described in the above step S20 may correspondingly include: step S201, acquiring pupil positions, pupil areas, and/or blink counts from successive frames of the eye images, respectively; and step S202, corresponding with the visual features, calculating the mean velocity of pupil motion according to each of the pupil positions within a first preset time period; step S203, calculating the mean angular velocity of pupil motion according to each of the pupil positions within a second preset time period; step S204 calculating the mean time duration of closing eyes according to each of the pupil areas within a third preset time period; and/or step S205, calculating the mean blink frequency according to the blink counts within a fourth preset time period.

For example, the first preset time period, the second preset time period, the third preset time period, and the fourth preset time period described above may be the same time period, or may be different time periods, and embodiments of the present disclosure are not limited thereto.

For example, in a case where the eye image of the user is acquired by an image capture device (e.g., an infrared camera), the image capture device may capture a plurality of frames of eye images, and the image capture device captures the images at a certain frame rate, for example, a frame rate of 240 frames/s, i.e., 240 frames of eye images per second can be captured.

For each frame of the captured successively eye images, visual feature extraction may be performed on each frame of images, or in order to reduce the calculation amount of visual feature extraction, visual feature extraction may be performed every several frames of images, which may acquire the pupil positions, pupil areas, and so on separately from each frame of the successive images.

Figure 2:
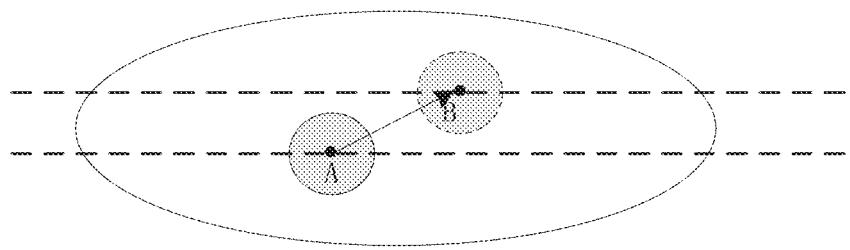
FIG. 2 is a schematic diagram illustrating a change of pupil positions of human eyes provided by some embodiments of the present disclosure.

For example, the velocity of pupil motion can be calculated according to two pupil positions of two successive frames of eye images. For example, for convenience of calculation, the pupil position may be a position of the pupil center. As shown in FIG. 2, the dashed line indicates a horizontal direction through which the pupil center passes; for two successive frames of images, assuming that the pupil center acquired from the eye image at time t is located at point A, and the two-dimensional coordinate of the pupil center position at time t is $(x_A, y_A)$; the pupil center acquired from the eye image at time t+1 is located at point B, and the two-dimensional coordinate of the pupil center position at time t+1 is $(x_B, y_B)$; and the frame rate of the image capture device is rate; then the velocity of pupil motion $v_{t+1}$ of at time t+1 can be calculated by the following formula:

$$v_{t+1} = \frac{\sqrt{(x_B - x_A)^2 + (y_B - y_A)^2}}{1/\text{rate}}$$

Figure 3:
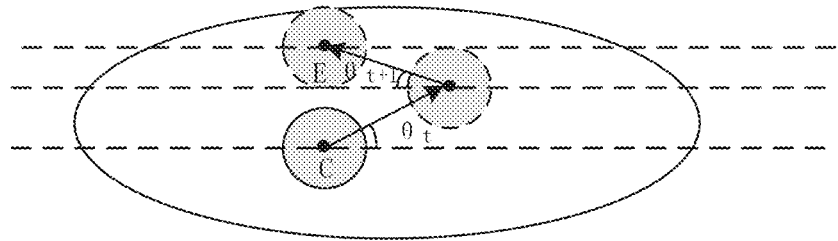
FIG. 3 is a schematic diagram illustrating a change of pupil positions of human eyes provided by some other embodiments of the present disclosure.

For example, the velocity of pupil motion can be calculated according to three pupil positions of three successive frames of eye images. For example, as shown in FIG. 3, the dashed line in the figure indicates the horizontal direction through which the pupil center passes; assuming that the pupil center acquired from the eye image at time t−1 is located at point C, and the two-dimensional coordinate of the pupil center position at time t−1 is $(x_C, y_C)$; the pupil center acquired from the eye image at time t is located at point D, the two-dimensional coordinate of the pupil center position at time t is $(x_D, y_D)$, and a motion angle of the pupil center at time t is $\theta_t$; the pupil center acquired from the eye image at time t+1 is located at point E, the two-dimensional coordinate of the pupil center position at time t+1 is $(x_E, y_E)$, and a motion angle of the pupil center at time t+1 is $\theta_{t+1}$; then the mean velocity of pupil motion $v_{t+1}$ at time t+1 can be calculated by the following formula:

$$V_{t+1} = \frac{|\theta_{t+1} - \theta_t|}{2*(1/\text{rate})},$$

where $$\theta_t = \arctan\left(\frac{|y_D - y_C|}{|x_D - x_C|}\right), \theta_{t+1} = \arctan\left(\frac{|y_E - y_D|}{|x_E - x_D|}\right).$$

Figure 4:
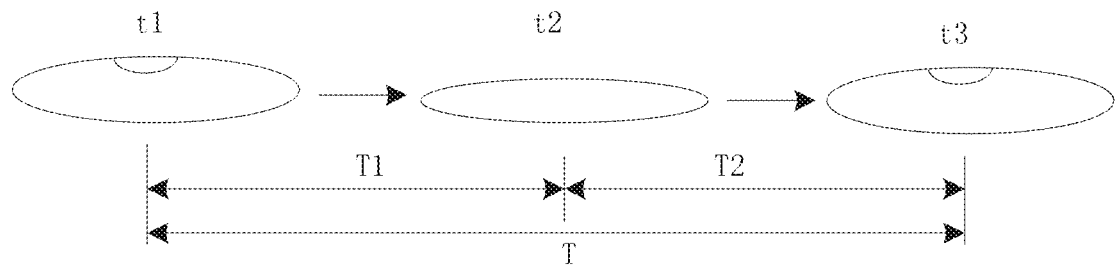
FIG. 4 is a schematic diagram illustrating a change of pupil areas of human eyes provided by some embodiments of the present disclosure.

For example, the time duration of closing eyes can be calculated according to each of pupil areas of three successive frames of the eye images. For example, referring to FIG. 4, the pupil area acquired according to the eye image at time t1 is not a complete pupil area, for example, ¼ of the complete pupil area, and it may be considered the user is closing eyes at this moment, and time t1 is taken as an initial time of closing eyes. At time t2, no pupil is detected according to the eye image at time t2, and it may be considered that the pupil area is zero at this moment, and a period from time t1 to time t2 is a half cycle of the closing eyes, which is t2−t1=T1. At time t3, the pupil area acquired from the eye image at time t3 is ¼ of the complete pupil area, and a period from time t2 to time t3 is the other half cycle of the closing eyes, which is t3−t2=T2, so that the time duration $t_{close}$ of closing eyes is equal to $t_{close}=T_1+T_2$.

The blink frequency f calculated according to the blink counts n within unit time t (for example, 1 second) is:

$$f = \frac{t}{n}.$$

The above method is to calculate a single velocity of pupil motion, a single angular velocity of pupil motion, a single time duration of closing eyes and the blink frequency per unit time from the multiple successive frames of eye images, but the above values calculated for once may have a relatively large error, and therefore, a mean value of the foregoing respective values within a preset time period can be calculated, and serve as a visual feature. Specifically, a mean velocity of pupil motion $\bar{v}$ within a preset time period T can be calculated by employing a plurality of velocities of pupil motion within this preset time period T using the above-mentioned method; a mean angular velocity of pupil motion $\bar{V}$ within this preset time period is calculated according to a plurality of angular velocities of pupil motion; the mean time duration $\overline{t_{close}}$ of closing eyes within this preset time period is calculated according to a plurality of durations of closing eyes; a mean blink frequency $\bar{f}$ within this preset time period is calculated according to a plurality of blink frequencies.

The preset time period may be selected according to requirements, such as, the preset time period of 60 s.

In some examples, corresponding with extracting the visual features, the calculating the visual fatigue value according to the visual features includes: acquiring a first visual fatigue value by comparing the mean velocity of pupil motion with mean velocity grade threshold values of pupil motion, acquiring a second visual fatigue value by comparing the mean angular velocity of pupil motion with mean angular velocity grade threshold values of pupil motion, acquiring a third visual fatigue value by comparing the mean time duration of closing eyes with mean time duration grade threshold values of closing eyes, and/or acquiring a fourth visual fatigue value by comparing the mean blink frequency with grade threshold values of a mean blink frequency. For example, the mean velocity grade threshold values of pupil motion comprise a mild fatigue threshold value of the mean velocity of pupil motion, a moderate fatigue threshold value of the mean velocity of pupil motion, and a severe fatigue threshold value of the mean velocity of pupil motion; the mean angular velocity grade threshold values of pupil motion comprise a mild fatigue threshold value of the mean angular velocity of pupil motion, a moderate fatigue threshold value of the mean angular velocity of pupil motion, and a severe fatigue threshold value of the mean angular velocity of pupil motion; the mean time duration grade threshold values of closing eyes comprise a mild fatigue threshold value of the mean time duration of closing eyes, a moderate fatigue threshold value of the mean time duration of closing eyes, and a severe fatigue threshold value of the mean time duration of closing eyes; the grade threshold values of the mean blink frequency comprise a mild fatigue threshold value of the mean blink frequency, a moderate fatigue threshold value of the mean blink frequency, and a severe fatigue threshold value of the mean blink frequency.

In some examples, calculating the visual fatigue value according to the visual features described in step S20 above may include the following steps S206, S207, S208, and/or S209.

In step S206, assigning a first velocity numerical value to the first visual fatigue value m1 in a case where the mean velocity of pupil motion $\bar{v}$ is less than the mild fatigue threshold value of the mean velocity of pupil motion $\overline{v}_{threshold}^{mild\ fatigue}$, for example, $m_1=0$; assigning a second velocity numerical value to the first visual fatigue value m1 in a case where the mean velocity of pupil motion $\overline{v}$ is greater than the moderate fatigue threshold value of the mean velocity of pupil motion $\overline{v}_{threshold}^{mild\ fatigue}$ and less than the mild fatigue threshold value of the mean velocity of pupil motion $\overline{v}_{threshold}^{mild\ fatigue}$, for example, $m_1=1$; assigning a third velocity numerical value to the first visual fatigue value m1 in a case where the mean velocity of pupil motion $\overline{v}$ is greater than the moderate fatigue threshold value of the mean velocity of pupil motion $\overline{v}_{threshold}^{moderate\ fatigue}$ and less than the severe fatigue threshold value of the mean velocity of pupil motion $\overline{v}_{threshold}^{severe\ fatigue}$, for example, $m_1=2$; assigning a fourth velocity numerical value to the first visual fatigue value m1 in a case where the mean velocity of pupil motion $\overline{v}$ is greater than the severe fatigue threshold value of the mean velocity of pupil motion $\overline{v}_{threshold}^{severe\ fatigue}$, for example, $m_1=3$.

The foregoing mild fatigue threshold value of the mean velocity of pupil motion $\overline{v}_{threshold}^{mild\ fatigue}$ is less than the moderate fatigue threshold value of the mean velocity of pupil motion $\overline{v}_{threshold}^{moderate\ fatigue}$, and the moderate fatigue threshold value of the mean velocity of pupil motion $\overline{v}_{threshold}^{moderate\ fatigue}$ is less than the severe fatigue threshold value of the mean velocity of pupil motion $\overline{v}_{threshold}^{severe\ fatigue}$.

For example, the foregoing mild fatigue threshold value of the mean velocity of pupil motion $\overline{v}_{threshold}^{mild\ fatigue}$, the moderate fatigue threshold value of the mean velocity of pupil motion $\overline{v}_{threshold}^{moderate\ fatigue}$, and the severe fatigue threshold value of the mean velocity of pupil motion $\overline{v}_{threshold}^{severe\ fatigue}$ can be preset according to empirical values.

In step S207, when assigning a first angular velocity numerical value to the second visual fatigue value m2 in a case where the mean angular velocity of pupil motion $\overline{\nabla}$ is less than the mild fatigue threshold value of the mean angular velocity of pupil motion $\overline{\nabla}_{threshold}^{mild\ fatigue}$, for example, $m_2=0$; assigning a second angular velocity numerical value to the second visual fatigue value m2 in a case where the mean angular velocity of pupil motion $\overline{\nabla}$ is greater than the mild fatigue threshold value of the mean angular velocity of pupil motion $\overline{\nabla}_{threshold}^{mild\ fatigue}$ and less than the moderate fatigue threshold value of the mean angular velocity of pupil motion $\overline{\nabla}_{threshold}^{moderate\ fatigue}$, for example, $m2=1$; assigning a third angular velocity numerical value to the second visual fatigue value m2 in a case where the mean angular velocity of pupil motion $\overline{\nabla}$ is greater than the moderate fatigue threshold value of the mean angular velocity of pupil motion $\overline{\nabla}_{threshold}^{moderate\ fatigue}$ and less than the severe fatigue threshold value of the mean angular velocity of pupil motion $\overline{\nabla}_{threshold}^{severe\ fatigue}$, for example, $m2=2$; assigning a fourth angular velocity numerical value to the second visual fatigue value m2 in a case where the mean angular velocity of pupil motion $\overline{\nabla}$ is greater than the severe fatigue threshold value of the mean angular velocity of pupil motion $\overline{\nabla}_{threshold}^{severe\ fatigue}$, for example, $m_2=3$.

The foregoing threshold value of mild fatigue of the mean angular velocity of pupil motion $\overline{\nabla}_{threshold}^{mild\ fatigue}$ is less than the threshold value of moderate fatigue of the mean angular velocity of pupil motion $\overline{\nabla}_{threshold}^{moderate\ fatigue}$, and the threshold value of moderate fatigue of the mean angular velocity of pupil motion $\overline{\nabla}_{threshold}^{moderate\ fatigue}$ is less than the threshold value of severe fatigue of the mean angular velocity of pupil motion $\overline{\nabla}_{threshold}^{severe\ fatigue}$.

The foregoing threshold value of mild fatigue of the mean angular velocity of pupil motion $\overline{\nabla}_{threshold}^{mild\ fatigue}$, the threshold value of moderate fatigue of the mean angular velocity of pupil motion $\overline{\nabla}_{threshold}^{moderate\ fatigue}$, and the threshold value of severe fatigue of the mean angular velocity of pupil motion $\overline{\nabla}_{threshold}^{severe\ fatigue}$ can be preset according to empirical values.

In step S208, assigning a first time numerical value to the third visual fatigue value m3 in a case where the mean time duration of closing eyes $\overline{t_{close}}$ is less than the mild fatigue threshold value of the mean time duration of closing eyes $\overline{t_{close}}_{threshold}^{mild\ fatigue}$, for example, $m3=0$; assigning a second time numerical value to the third visual fatigue value m3 in a case where the mean time duration of closing eyes $\overline{t_{close}}$ is greater than the mild fatigue threshold value of the mean time duration of closing eyes $\overline{t_{close}}_{threshold}^{mild\ fatigue}$ and less than the moderate fatigue threshold value of the mean time duration of closing eyes $\overline{t_{close}}_{threshold}^{moderate\ fatigue}$, for example, $m3=1$; assigning a third time numerical value to the third visual fatigue value m3 in a case where the mean time duration of closing eyes $\overline{t_{close}}$ is greater than the moderate fatigue threshold value of the mean time duration of closing eyes $\overline{t_{close}}_{threshold}^{moderate\ fatigue}$ and less than the severe fatigue threshold value of the mean time duration of closing eyes $\overline{t_{close}}_{threshold}^{severe\ fatigue}$, for example, $m3=2$; assigning a fourth time numerical value to the third visual fatigue value m3 in a case where the mean time duration of closing eyes $\overline{t_{close}}$ is greater than the severe fatigue threshold value of the mean time duration of closing eyes $\overline{t_{close}}_{threshold}^{severe\ fatigue}$, for example, $m3=3$. The foregoing mild fatigue threshold value of the mean time duration of closing eyes $\overline{t_{close}}_{threshold}^{mild\ fatigue}$ is less than the moderate fatigue threshold value of the mean time duration of closing eyes $\overline{t_{close}}_{threshold}^{moderate\ fatigue}$, and the moderate fatigue threshold value of the mean time duration of closing eyes $\overline{t_{close}}_{threshold}^{moderate\ fatigue}$ is less than the severe fatigue threshold value of the mean time duration of closing eyes $\overline{t_{close}}_{threshold}^{severe\ fatigue}$.

The foregoing mild fatigue threshold value of the mean time duration of closing eyes $\overline{t_{close}}_{threshold}^{mild\ fatigue}$, the moderate fatigue threshold value of the mean time duration of closing eyes $\overline{t_{close}}_{threshold}^{moderate\ fatigue}$ and the severe fatigue threshold value of the mean time duration of closing eyes $\overline{t_{close}}_{threshold}^{severe\ fatigue}$ can be preset according to empirical values.

In step S209, assigning a first frequency numerical value to the fourth visual fatigue value m4 in a case where the mean blink frequency $\overline{f}$ is less than the mild fatigue threshold value of the mean blink frequency $\overline{f}_{threshold}^{mild\ fatigue}$, for example, $m4=0$; assigning a second frequency numerical value to the fourth visual fatigue value m4 in a case where the mean blink frequency $\overline{f}$ is greater than the mild fatigue threshold value of the mean blink frequency $\overline{f}_{threshold}^{mild\ fatigue}$ and less than the moderate fatigue threshold value of the mean blink frequency $\overline{f}_{threshold}^{moderate\ fatigue}$, for example, $m4=1$; assigning a third frequency numerical value to the fourth visual fatigue value m4 in a case where the mean blink frequency $\overline{f}$ is greater than the moderate fatigue threshold value of the mean blink frequency $\overline{f}_{threshold}^{moderate\ fatigue}$ and less than the severe fatigue threshold value of the mean blink frequency $\overline{f}_{threshold}^{severe\ fatigue}$, for example, $m4=2$; assigning a fourth frequency numerical value to the fourth visual fatigue value m4 in a case where the mean blink frequency $\overline{f}$ is greater than the severe fatigue threshold value of the mean blink frequency $\overline{f}_{threshold}^{severe\ fatigue}$, for example, $m4=3$.

The mild fatigue threshold value of the mean blink frequency $\overline{f}_{threshold}^{mild\ fatigue}$ is less than the moderate fatigue threshold value of the mean blink frequency $\bar{f}_{threshold}^{moderate\ fatigue}$, and the moderate fatigue threshold value of the mean blink frequency $\bar{f}_{threshold}^{moderate\ fatigue}$ is less than the severe fatigue threshold value of the mean blink frequency $\bar{f}_{threshold}^{severe\ fatigue}$. The foregoing mild fatigue threshold value of the mean blink frequency $\bar{f}_{threshold}^{mild\ fatigue}$, the moderate fatigue threshold value of the mean blink frequency $\bar{f}_{threshold}^{moderate\ fatigue}$, and the severe fatigue threshold value of the mean blink frequency $\bar{f}_{threshold}^{severe\ fatigue}$ can be preset according to empirical values.

It should be noted that the first velocity numerical value, the second velocity numerical value, the third velocity numerical value, and the fourth velocity numerical value herein may be an artificially set as a first sequence having a certain regularity; the first angular velocity numerical value, the second angular velocity numerical value. The third triangular velocity numerical value and the fourth angular velocity numerical value may be an artificially set as a second sequence having a certain regularity; the first time numerical value, the second time numerical value, the third time numerical value, and the fourth time numerical value may be an artificially set as a third sequence having a certain regularity; and the first frequency numerical value, the second frequency numerical value, the third frequency numerical value, and the fourth frequency numerical value may be an artificially set as a fourth sequence having a certain regularity.

For example, the first sequence, the second sequence, the third sequence, and the fourth sequence may be the same.

For example, calculating visual fatigue value according to the visual features further includes determining the visual fatigue value according to the first visual fatigue value, the second visual fatigue value, the third visual fatigue value, and/or the fourth visual fatigue value.

For example, in a case where the first sequence, the second sequence, the third sequence, and the fourth sequence are the same, the visual fatigue value may be calculated by step S210: calculating a sum of the first visual fatigue value, the second visual fatigue value, and the third visual fatigue value and/or the fourth visual fatigue value described above as the visual fatigue value, i.e., the visual fatigue value m is a sum of the first visual fatigue value m1, the second visual fatigue value m2, the third visual fatigue value m3, and/or the fourth visual fatigue value m4, i.e., m=m1+m2+m3+m4, which may also be referred to as a visual fatigue overall value.

In another example, in a case where the first sequence, the second sequence, the third sequence, and the fourth sequence are different, the first visual fatigue value m1, the second visual fatigue value m2, the third visual fatigue value m3 and/or the fourth visual fatigue value m4 may be firstly normalized and then summed to obtain the visual fatigue value. After the above-mentioned visual fatigue value is obtained, the visual fatigue value can be compared with the fatigue grade threshold values, and the visual fatigue grade can be determined according to the comparison result. For example, the visual fatigue grades can be classified into a mild fatigue grade, a moderate fatigue grade, and a severe fatigue grade, and the fatigue grade threshold values also includes a mild fatigue threshold value, a moderate fatigue threshold value, and a severe fatigue threshold value. For example, the mild fatigue threshold value, the moderate fatigue threshold value, and the severe fatigue threshold value can be determined according to the first sequence, the second sequence, the third sequence, and the fourth sequence described above.

For example, comparing the visual fatigue value with fatigue grade threshold values and determining the visual fatigue grade according to the comparison result includes: determining the visual fatigue grade to be a mild fatigue grade in a case where the visual fatigue value is greater than or equal to the mild fatigue threshold value and less than the moderate fatigue threshold value; determining the visual fatigue grade to be a moderate fatigue grade in a case where the visual fatigue value is greater than or equal to the moderate fatigue threshold value and less than the severe fatigue threshold value; determining the visual fatigue grade to be severe fatigue grade in a case where the visual fatigue value is greater than or equal to the severe fatigue threshold value.

For example, corresponding with the first sequence, the second sequence, the third sequence, and the fourth sequence, the mild fatigue threshold value is exemplarily 4, the moderate fatigue threshold value is exemplarily 7, and the threshold value of severe fatigue is exemplarily 10, and thus, in a case where $4 \leq m < 7$, then it can be determined that the fatigue grade of the human eyes of the user is a mild fatigue grade; in a case where $7 \leq m < 10$, then it can be determined that the fatigue grade of the human eyes of the user is a moderate fatigue grade; and in a case where $10 \leq m$, then it can be determined that the fatigue grade of the human eyes of the user is a severe fatigue grade.

In another example, the visual fatigue recognition method may further include generating a corresponding alert signal according to the above-mentioned visual fatigue grade, and generating a corresponding alert signal according to the visual fatigue grade, which exemplarily includes: generating an image flashing signal of a corresponding color and/or a vibration signal of a corresponding frequency according to the visual fatigue grade, so that a screen of a virtual reality apparatus displays an image of the corresponding color which flashes at a first preset frequency and/or, the virtual reality apparatus vibrates at a second preset frequency.

In this embodiment, the alert signal may include a visual signal and/or a haptic signal, and the visual signal may specifically be an image flashing signal, the virtual reality apparatus may display the image of a corresponding color on the screen thereof after receiving the image flashing signal, and the image flashes at a preset frequency; the haptic signal may be a vibration signal of a corresponding frequency, and the VR apparatus vibrates at a preset frequency after receiving the vibration signal. The user is better alerted by the image flashing signal and the vibration signal, so as to be informed of the fatigue grade of human eyes.

For example, in a case where the visual fatigue grade is determined as a mild fatigue grade, a green flashing triangle image may appear on the screen of the VR apparatus, and the VR apparatus vibrates mildly (at a certain low frequency) for warning the mild fatigue grade. In a case where the visual fatigue grade is determined as a moderate fatigue, an orange flashing triangle image may appear on the screen of the VR apparatus, and the VR apparatus vibrates moderately (at a certain higher frequency) for warning the moderate fatigue grade; In a case where the visual fatigue grade is determined as a severe fatigue grade, a red flashing triangle image may appear on the screen of the VR apparatus, and the VR apparatus vibrates severely (at a certain even higher frequency) for warning the severe fatigue grade.

Figure 5A:
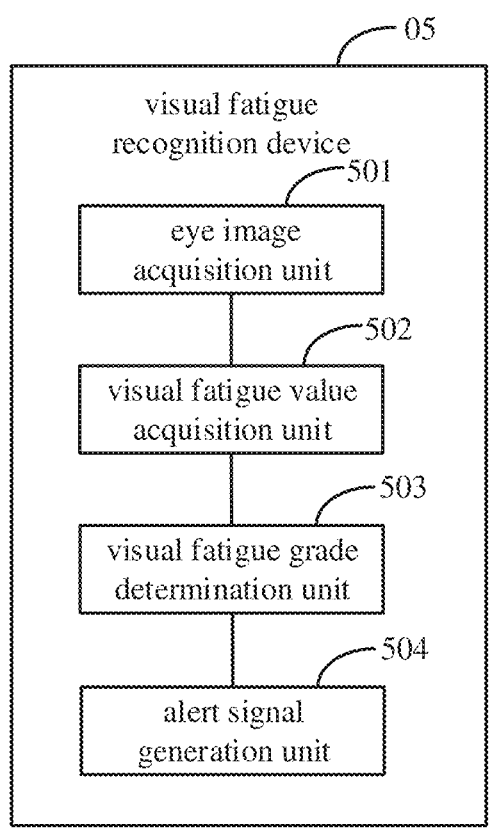
FIG. 5A is a block diagram of a visual fatigue recognition device provided by some embodiments of the present disclosure.

Embodiments of the present disclosure further provide a visual fatigue recognition device. As shown in FIG. 5A, the visual fatigue recognition device 05 includes an eye image acquisition unit 501 configured to acquire an eye image of a user; a visual fatigue value acquisition unit 502 configured to acquire visual features from the eye image and to calculate a visual fatigue value according to the visual features; a visual fatigue grade determination unit 503 configured to compare the visual fatigue value with a fatigue grade threshold values and to determine a visual fatigue grade according to the comparison result.

In some examples, for example, as shown in FIG. 5A, the visual fatigue recognition device 05 may further include an alert signal generation unit 504 configured to generate a corresponding alert signal according to the visual fatigue grade.

Figure 5B:
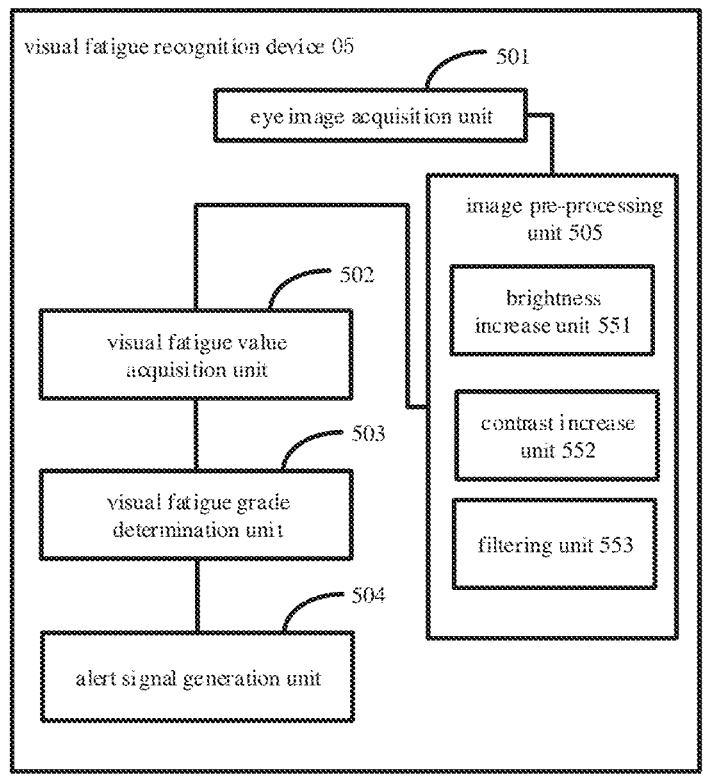
FIG. 5B is a schematic block diagram of a visual fatigue recognition device provided by some other embodiments of the present disclosure.

In some examples, as shown in FIG. 5B, the visual fatigue recognition apparatus can further include an image pre-processing unit 505. The image pre-processing unit 505 may include one or more of the following components: a brightness increase unit 551, a contrast increase unit 552, and a filtering unit 553. The brightness increase unit 551 is configured to increase the brightness of the eye image, the contrast increase unit 552 is configured to increase the contrast of the eye image, and the filtering unit 553 is configured to perform a denoising process on the eye image.

For example, the visual features include a mean velocity of pupil motion, a mean angular velocity of pupil motion, a mean time duration of closing eyes, and/or a mean blink frequency. Correspondingly, as illustrated in FIG. 6, the visual fatigue value acquisition unit 502 includes: a visual feature acquisition sub-unit 521 configured to respectively acquire pupil positions, pupil areas, and/or blink counts from successive frames of eye images; a mean velocity of pupil motion calculation sub-unit 522 configured to calculate the mean velocity of pupil motion according to each of the pupil positions in a first preset time period; a mean angular velocity of pupil motion calculation sub-unit 523 configured to calculate the mean angular velocity of pupil motion according to each of the pupil positions in a second preset time period; a mean time duration of closing eyes calculation sub-unit 524 configured to calculate the mean time duration of closing eyes according to each of the pupil areas in a third preset time period; and/or a mean blink frequency calculation sub-unit 525 configured to calculate the mean time duration of closing eyes according to the blink counts in a fourth preset time period.

For example, the first preset time period, the second preset time period, the third preset time period, and the fourth preset time period describe above may be the same time period, or may be different time periods, and embodiments of the present disclosure are not limited thereto.

Figure 6:
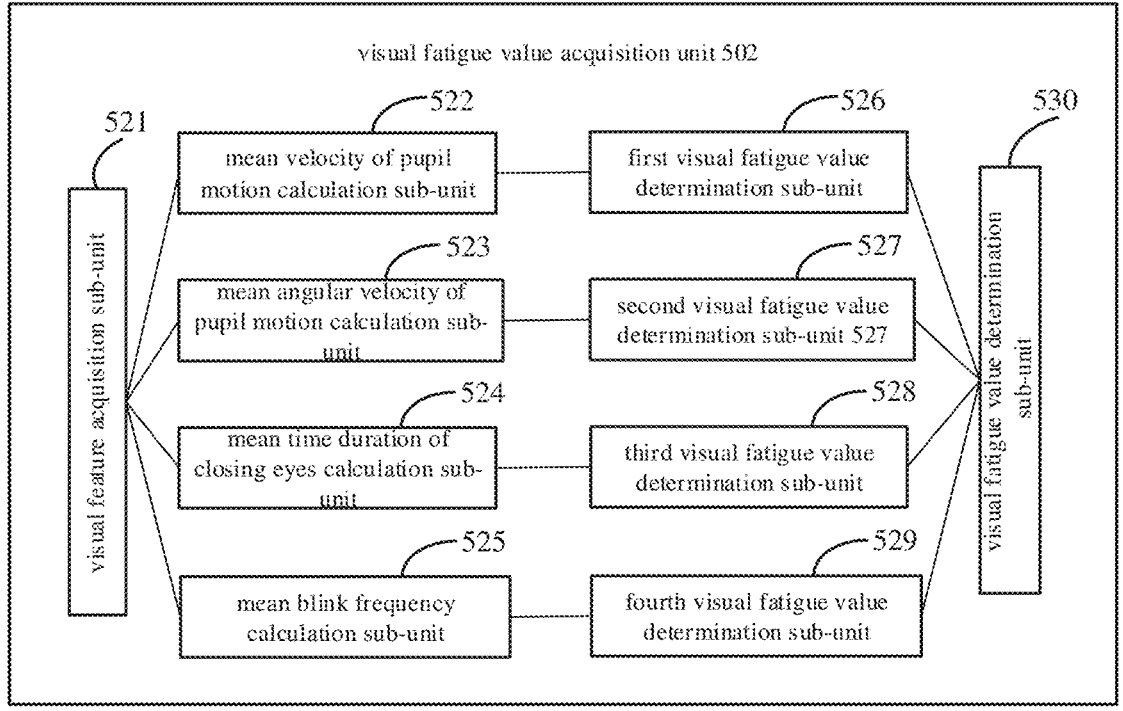
FIG. 6 is a schematic block diagram of a visual fatigue acquisition unit provided by some embodiments of the present disclosure.

For example, as shown in FIG. 6, the visual fatigue value acquisition unit 502 may further include a first visual fatigue value determination sub-unit 526, a second visual fatigue value determination sub-unit 527, a third visual fatigue value determination sub-unit 528 and/or a fourth visual fatigue value determination sub-unit 529. The first visual fatigue value determination sub-unit 526 is configured to acquire a first visual fatigue value by comparing the mean velocity of pupil motion with mean velocity grade threshold values of pupil motion. The second visual fatigue value determination sub-unit 527 is configured to acquire a second visual fatigue value by comparing the mean angular velocity of pupil motion with graded threshold values of the mean angular velocity of pupil motion with mean angular velocity threshold values of pupil motion. The third visual fatigue value determination sub-unit 528 is configured to acquire a third visual fatigue value by comparing the mean time duration of closing eyes with mean time duration grade threshold values of closing eyes. The fourth visual fatigue value determination sub-unit 529 is configured to acquire a fourth visual fatigue value by comparing the mean blink frequency with grade threshold values of the mean blink frequency.

For example, the visual fatigue value acquisition unit 502 may further include a visual fatigue value determination sub-unit 530 configured to determine the visual fatigue value according to the first visual fatigue value, the second visual fatigue value, the third visual fatigue value, and/or the fourth visual fatigue value.

For example, the mean velocity grade threshold values of pupil motion comprise a mild fatigue threshold value of the mean velocity of pupil motion, a moderate fatigue threshold value of the mean velocity of pupil motion, and a severe fatigue threshold value of the mean velocity of pupil motion; the mean angular velocity grade threshold values of pupil motion comprise a mild fatigue threshold value of the mean angular velocity of pupil motion, a moderate fatigue threshold value of the mean angular velocity of pupil motion, and a severe fatigue threshold value of the mean angular velocity of pupil motion; the mean time duration grade threshold values of closing eyes comprise a mild fatigue threshold value of the mean time duration of closing eyes, a moderate fatigue threshold value of the mean time duration of closing eyes, and a severe fatigue threshold value of the mean time duration of closing eyes; the grade threshold values of the mean blink frequency comprise a mild fatigue threshold value of the mean blink frequency, a moderate fatigue threshold value of the mean blink frequency, and a severe fatigue threshold value of the mean blink frequency.

For example, the first visual fatigue value determination sub-unit 526 is configured to assign a first velocity numerical value to the first visual fatigue value in a case where the mean velocity of pupil motion is less than the mild fatigue threshold value of the mean velocity of pupil motion, to assign a second velocity numerical value to the first visual fatigue value in a case where the mean velocity of pupil motion is greater than the moderate fatigue threshold value of the mean velocity of pupil motion and less than the mild fatigue threshold value of the mean velocity of pupil motion, to assign a third velocity numerical value to the first visual fatigue value in a case where the mean velocity of pupil motion is greater than the moderate fatigue threshold value of the mean velocity of pupil motion and less than the severe fatigue threshold value of the mean velocity of pupil motion, and further to assign a fourth velocity numerical value to the first visual fatigue value in a case where the mean velocity of pupil motion is greater than the severe fatigue threshold value of the mean velocity of pupil motion. The mild fatigue threshold value of the mean velocity of pupil motion is less than the moderate fatigue threshold value of the mean velocity of pupil motion, and the moderate fatigue threshold value of the mean velocity of pupil motion is less than the severe fatigue threshold value of the mean velocity of pupil.

For example, the second visual fatigue value determination sub-unit 527 is configured to assign a first angular velocity numerical value to the second visual fatigue value in a case where the mean angular velocity of pupil motion is less than the mild fatigue threshold value of the mean angular velocity of pupil motion, to assign a second angular velocity numerical value to the second visual fatigue value in a case where the mean angular velocity of pupil motion is greater than the mild fatigue threshold value of the mean angular velocity of pupil motion and less than the moderate fatigue threshold value of the mean angular velocity of pupil motion, to assign a third angular velocity numerical value to the second visual fatigue value in a case where the mean angular velocity of pupil motion is greater than the moderate fatigue threshold value of the mean angular velocity of pupil motion and less than the severe fatigue threshold value of the mean angular velocity of pupil motion, and further to assign a fourth angular velocity numerical value to the second visual fatigue value in a case where the mean angular velocity of pupil motion is greater than the severe fatigue threshold value of the mean angular velocity of pupil motion. The threshold value of mild fatigue of the mean angular velocity of pupil motion is less than the threshold value of moderate fatigue of the mean angular velocity of pupil motion, and the threshold value of moderate fatigue of the mean angular velocity of pupil motion is less than the threshold value of severe fatigue of the mean angular velocity of pupil motion.

For example, the third visual fatigue value determination sub-unit 528 is configured to assign a first time numerical value to the third visual fatigue value in a case where the mean time duration of closing eyes is less than the mild fatigue threshold value of the mean time duration of closing eyes, to assign a second time numerical value to the third visual fatigue value in a case where the mean time duration of closing eyes is greater than the mild fatigue threshold value of the mean time duration of closing eyes and less than the moderate fatigue threshold value of the mean time duration of closing eyes, to assign a third time numerical value to the third visual fatigue value in a case where the mean time duration of closing eyes is greater than the moderate fatigue threshold value of the mean time duration of closing eyes and less than the severe fatigue threshold value of the mean time duration of closing eyes, and further to assign a fourth time numerical value to the third visual fatigue value in a case where the mean time duration of closing eyes is greater than the severe fatigue threshold value of the mean time duration of closing eyes. The mild fatigue threshold value of the mean time duration of closing eyes is less than the moderate fatigue threshold value of the mean time duration of closing eyes, and the moderate fatigue threshold value of the mean time duration of closing eyes is less than the severe fatigue threshold value of the mean time duration of closing eyes.

The fourth visual fatigue value determination sub-unit 529 is configured to assign a first frequency numerical value to the fourth visual fatigue value in a case where the mean blink frequency is less than the mild fatigue threshold value of the mean blink frequency, to assign a second frequency numerical value to the fourth visual fatigue value in a case where the mean blink frequency is greater than the mild fatigue threshold value of the mean blink frequency and less than the moderate fatigue threshold value of the mean blink frequency, to assign a third frequency numerical value to the fourth visual fatigue value in a case where the mean blink frequency is greater than the moderate fatigue threshold value of the mean blink frequency and less than the severe fatigue threshold value of the mean blink frequency, and further to assign a fourth frequency numerical value to the fourth visual fatigue value in a case where the mean blink frequency is greater than the severe fatigue threshold value of the mean blink frequency. The mild fatigue threshold value of the mean blink frequency is less than the moderate fatigue threshold value of the mean blink frequency, and the moderate fatigue threshold value of the mean blink frequency is less than the severe fatigue threshold value of the mean blink frequency.

It should be noted that the first velocity numerical value, the second velocity numerical value, the third velocity numerical value, and the fourth velocity numerical value herein may be an artificially set first sequence having a certain regularity; the first angular velocity numerical value, the second angular velocity numerical value, The third triangular velocity numerical value and the fourth angular velocity numerical value may be an artificially set second sequence having a certain regularity; the first time numerical value, the second time numerical value, the third time numerical value, and the fourth time numerical value may be an artificially set third sequence having a certain regularity; the first frequency numerical value, the second frequency numerical value, the third frequency numerical value, and the fourth frequency numerical value may be an artificially set fourth sequence having a certain regularity.

For example, the first sequence, the second sequence, the third sequence, and the fourth sequence may be the same.

For example, calculating visual fatigue value according to the visual features further includes determining the visual fatigue value according to the first visual fatigue value, the second visual fatigue value, the third visual fatigue value, and/or the fourth visual fatigue value.

For example, in a case where the first sequence, the second sequence, the third sequence, and the fourth sequence are the same, the visual fatigue value determination sub-unit 530 may calculate a sum of the first visual fatigue value, the second visual fatigue value, and the third visual fatigue value and/or the fourth visual fatigue value as the visual fatigue value.

In another example, in a case where the first sequence, the second sequence, the third sequence, and the fourth sequence are different, the visual fatigue value determination sub-unit 530 may perform normalization firstly of and then calculate a sum of the first visual fatigue value m1, the second visual fatigue value m2, the third visual fatigue value m3 and/or the fourth visual fatigue value m4 to obtain the visual fatigue value.

For example, the fatigue grade threshold values includes a mild fatigue threshold value, a moderate fatigue threshold value and a severe fatigue threshold value, and the visual fatigue grade determination unit 503 is configured to determine the visual fatigue grade to be a mild fatigue grade in a case where the visual fatigue value is greater than or equal to the mild fatigue threshold value and less than the moderate fatigue threshold value; to determine the visual fatigue grade to be a moderate fatigue grade in a case where the visual fatigue value is greater than or equal to the moderate fatigue threshold value and less than the severe fatigue threshold value; and further to determine the visual fatigue grade to be severe fatigue grade in a case where the visual fatigue value is greater than or equal to the severe fatigue threshold value.

Corresponding with the foregoing embodiments of the visual fatigue recognition method, the visual fatigue device provided by the present disclosure can reduce risk of problems such as myopia, which helps to protect user's eyesight.

For the embodiments of the device, implementation processes of functions and effects of individual units may be referred specifically to the implementation processes of the corresponding steps in the above-mentioned method, which will not be repeated herein.

The embodiments of the device described above are merely illustrative, and the units illustrated as the separate components may or may not be physically separated, i.e., may be located at one place, or may be distributed over multiple network units; the above-mentioned units may be incorporated into one unit, or may be further split into a plurality of sub-units.

The individual units in the device of the embodiments of the present disclosure may be implemented by virtue of software, or by mean of both software and hardware, and by hardware as well. Based on such understanding, the technical solutions of the present disclosure substantially, or namely the contribution to the prior art, may be embodied in a form of a software product. Taking an implementation of software as an example, as a device in a logical meaning, the device is formed by reading the corresponding computer program instructions in the non-volatile memory into an internal memory for running through a processor of an apparatus which applies the device.

Figure 7:
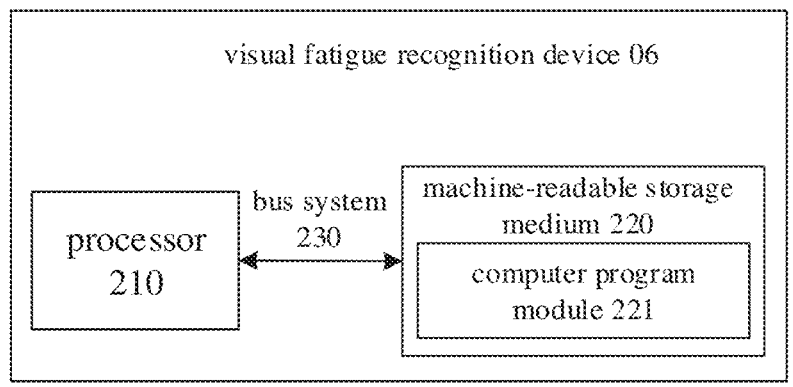
FIG. 7 is a schematic block diagram of a visual fatigue recognition device provided by some embodiments of the present disclosure.

FIG. 7 is a schematic block diagram of another visual fatigue recognition device 06 provided by at least one embodiment of the present disclosure. As shown in FIG. 7, the visual fatigue recognition device 06 includes a processor 210, a machine-readable storage medium 220, and one or more computer program modules 221.

For example, the processor 210 is connected with the machine-readable storage medium 220 via a bus system 230. For example, one or more computer program modules 221 are stored in the machine-readable storage medium 220. For example, one or more computer program modules 221 include instructions for executing the visual fatigue recognition method provided by any of the embodiments of the present disclosure. For example, instructions in one or more computer program modules 221 can be executed by the processor 210. For example, the bus system 230 may be a conventional serial, parallel communication bus, etc., and embodiments of the present disclosure are not limited thereto.

For example, the processor 210 may be a central processing unit (CPU), an image processing unit (GPU), or other forms of processing unit having capabilities of data processing and/or of instruction execution, and may be a general-purpose processor or a dedicated processor, and can control other components in the visual fatigue recognition device 06 to perform desired functions.

The machine-readable storage medium 220 may include one or more computer program products, which may include various forms of computer-readable storage media, such as a volatile memory and/or a non-volatile memory. The volatile memory may include, for example, a random access memory (RAM) and/or a cache and the like. The non-volatile memory may include, for example, a read only memory (ROM), a hard disk, a flash memory, and the like. One or more computer program instructions can be stored on a computer-readable storage medium, and the processor 210 can execute the program instructions to implement the functions (implemented by the processor 210) and/or other desired functions (e.g. the visual fatigue recognition method and the like) in embodiments of the present disclosure. Various applications and various data, such as a sequence of face images, and various data used and/or produced by the applications, etc., may also be stored in the computer readable storage medium.

It should be noted that, in order to be clear and concise, the embodiments of the present disclosure do not provide all composition units of the visual fatigue recognition device. In order to realize the necessary functions of the visual fatigue recognition device, those skilled in the art can provide and set other composition units not shown according to specific requirements, which is not limited to the embodiments of the present disclosure.

Figure 8A:
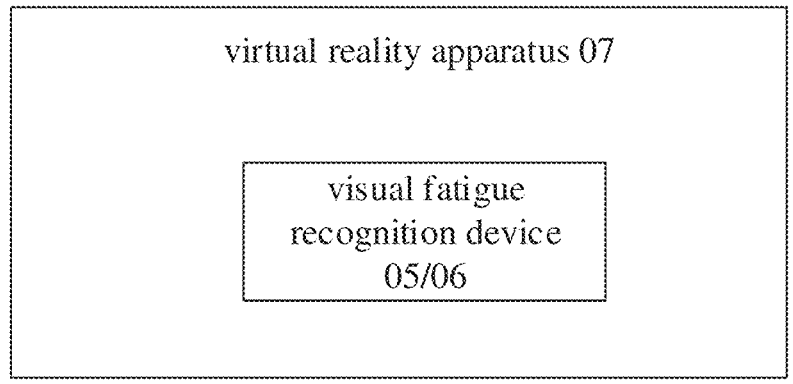
FIG. 8A is a schematic block diagram of a virtual reality apparatus provided by some embodiments of the present disclosure.

As shown in FIG. 8A, embodiments of the present disclosure further provide a virtual reality apparatus 07, including the visual fatigue recognition device 05 or the visual fatigue recognition device 06 as described above.

Figure 8B:
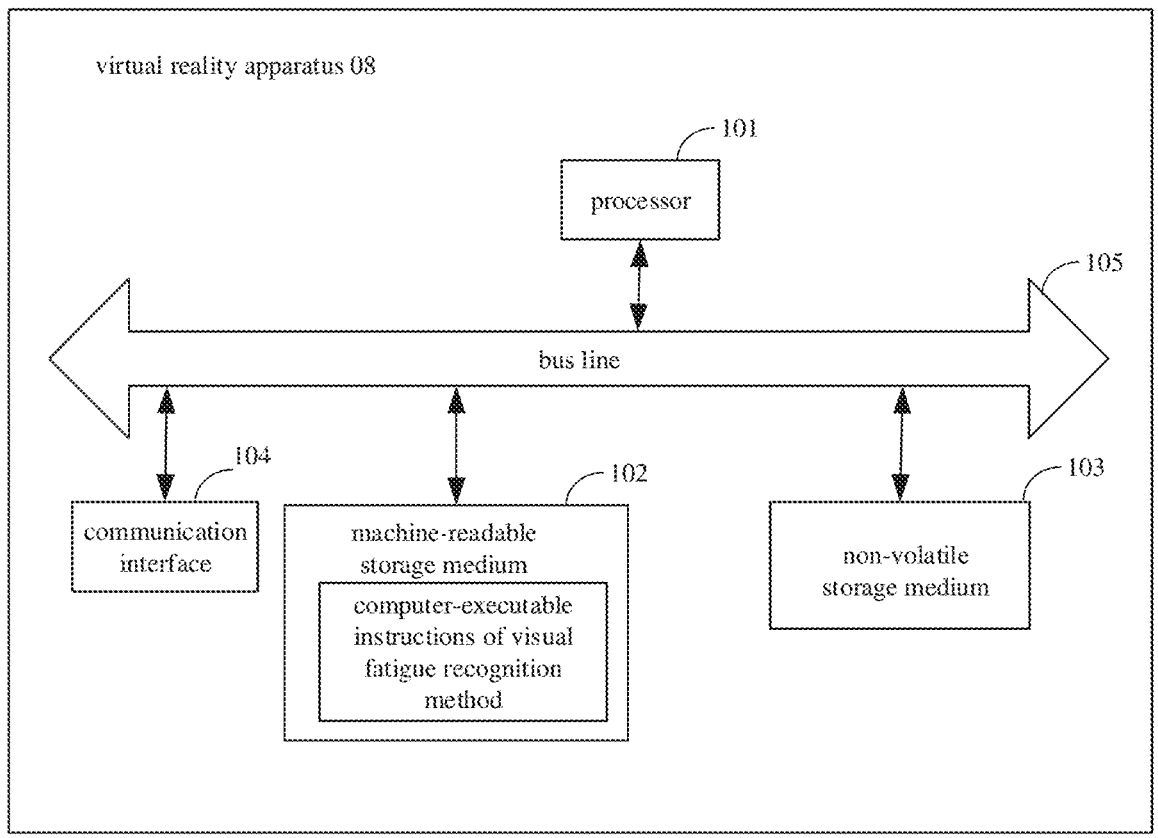
FIG. 8B is a schematic block diagram of a virtual reality apparatus provided by some other embodiments of the present disclosure.

Embodiments of the present disclosure further provide another virtual reality apparatus 08, and FIG. 8B is a schematic block diagram of the virtual reality apparatus 08. As shown in FIG. 8B, the virtual reality apparatus 08 includes a machine-readable storage medium 102 and a processor 101, and may further include a non-volatile storage medium 103, a communication interface 104, and a bus line 105. The machine-readable storage medium 102, the processor 101, the non-volatile storage medium 103, and the communication interface 104 realize communication with each other via the bus line 105. The processor 101 can perform the visual fatigue recognition method described above by reading and executing the machine executable instructions corresponding with the control logic of the visual fatigue recognition method in the machine-readable storage medium 102.

For example, the communication interface 104 is coupled with a communication device (not shown). The communication device may communicate with the network and other apparatuses via wireless communication; for example, the network may be the Internet, an intranet, and/or a wireless network such as a cellular telephone network, a wireless local area network (LAN), and/or a metropolitan area network (MAN). The wireless communication may use any one of a variety of communication standards, protocols, and technologies including, including but not limited to, Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wi-Fi (e.g., based on IEEE 802.11a, IEEE 802.11b, IEEE 802.11g and/or IEEE 802.11n standards), Internet-based Protocol Voice over Internet Protocol (VoIP), Wi-MAX, protocols for email, instant messaging, and/or short message service (SMS), or any other suitable communication protocols.

The machine-readable storage medium referred to herein may be any electronic, magnetic, optical, or other physical storage devices which can contain or store information, such as executable instructions, data, and so on. For example, the machine-readable storage medium may be: a RAM (Radom Access Memory), a volatile memory, a non-volatile memory, a flash memory, a storage drive (such as a hard disk drive), any type of storage disk (such as a compact disk, a DVD, etc.), or a similar storage medium or a combination thereof.

The non-volatile medium can be a non-volatile memory, a flash memory, a storage drive (such as a hard drive), any type of storage disk (such as a compact disc, a DVD, etc.), or a similar non-volatile storage medium, or a combination thereof.

Indeed, the above-mentioned VR apparatus may also include other existing components, and will not be repeated herein.

Figure 8C:
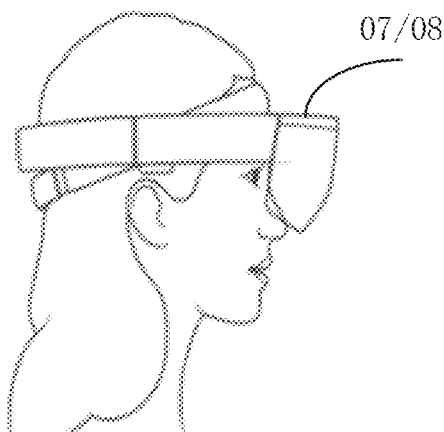
FIG. 8C is a schematic block diagram of a virtual reality apparatus provided by still some other embodiments of the present disclosure.

As shown in FIG. 8C, the virtual reality apparatus 07/08 may be worn on the eyes of a person, thereby implementing a function of visual fatigue recognition on the user according to requirements.

Embodiments of the present disclosure also provide a storage medium. For example, the storage medium stores computer-readable instructions non-transitorily, and the visual fatigue recognition method provided by any one of embodiments of the present disclosure can be performed in a case where the non-transitory computer readable instructions are executed by a computer (including a processor).

For example, the storage medium may be any combination of one or more computer-readable storage media; for example, one computer-readable storage medium includes computer readable program codes for acquiring an eye image of a user, and another computer readable storage medium includes computer readable program codes for acquiring visual features from the eye image. For example, in a case where the program codes are read by the computer, the computer can execute the program codes stored in the computer storage medium to perform, for example, the visual fatigue recognition method provided by any one of the embodiments of the present disclosure.

For example, the storage medium may include a memory card of a smart phone, a storage component of a tablet, a hard disk of a personal computer, a random access memory (RAM), a read only memory (ROM), an erasable programmable read only memory (EPROM), a portable compact disk read only memory (CD-ROM), a flash memory, or any combination of the above storage media, or else other suitable storage media.

What are described above is related to the illustrative embodiments of the disclosure only and not limitative to the scope of the disclosure; the scopes of the disclosure are defined by the accompanying claims.

What is claimed is:

1. A visual fatigue recognition method applied in a virtual reality apparatus, comprising:
  acquiring an eye image of a user;
  acquiring visual features from the eye image, and calculating a visual fatigue value according to the visual features;
  comparing the visual fatigue value with fatigue grade threshold values and determining a visual fatigue grade according to the comparison result; and
  generating a corresponding alert signal according to the visual fatigue grade,
  wherein the visual features comprise at least one of a mean velocity of pupil motion, a mean angular velocity of pupil motion, a mean time duration of closing eyes or a mean blink frequency;
  the acquiring visual features from the eye image comprises:
  acquiring respectively from successive frames of eye images at least one of pupil positions, pupil areas, or blink counts;
  and then corresponding with the visual features:
    calculating the mean velocity of pupil motion according to each of the pupil positions within a first preset time period;
    calculating the mean angular velocity of pupil motion according to each of the pupil positions within a second preset time period;
    calculating the mean time duration of closing eyes according to each of the pupil areas within a third preset time period; and/or
    calculating the mean blink frequency according to the blink counts within a fourth preset time period;
  corresponding with acquiring the visual feature, the calculating the visual fatigue value according to the visual features comprises at least one of:
  acquiring a first visual fatigue value by comparing the mean velocity of pupil motion with mean velocity grade threshold values of pupil motion,
  acquiring a second visual fatigue value by comparing the mean angular velocity of pupil motion with mean angular velocity grade threshold values of pupil motion,
  acquiring a third visual fatigue value by comparing the mean time duration of closing eyes with mean time duration grade threshold values of closing eyes, or
  acquiring a fourth visual fatigue value by comparing the mean blink frequency with grade threshold values of a mean blink frequency;
  wherein the mean velocity grade threshold values of pupil motion comprise a mild fatigue threshold value of the mean velocity of pupil motion, a moderate fatigue threshold value of the mean velocity of pupil motion, and a severe fatigue threshold value of the mean velocity of pupil motion; the mean angular velocity grade threshold values of pupil motion comprise a mild fatigue threshold value of the mean angular velocity of pupil motion, a moderate fatigue threshold value of the mean angular velocity of pupil motion, and a severe fatigue threshold value of the mean angular velocity of pupil motion; the mean time duration grade threshold values of closing eyes comprise a mild fatigue threshold value of the mean time duration of closing eyes, a moderate fatigue threshold value of the mean time duration of closing eyes, and a severe fatigue threshold value of the mean time duration of closing eyes; the grade threshold values of the mean blink frequency comprise a mild fatigue threshold value of the mean blink frequency, a moderate fatigue threshold value of the mean blink frequency, and a severe fatigue threshold value of the mean blink frequency;
  the acquiring the first visual fatigue value by comparing the mean velocity of pupil motion with the mean velocity grade threshold values of pupil motion comprises:
  assigning a first velocity numerical value to the first visual fatigue value in a case where the mean velocity of pupil motion is less than the mild fatigue threshold value of the mean velocity of pupil motion, assigning a second velocity numerical value to the first visual fatigue value in a case where the mean velocity of pupil motion is greater than the moderate fatigue threshold value of the mean velocity of pupil motion and less than the mild fatigue threshold value of the mean velocity of pupil motion, assigning a third velocity numerical value to the first visual fatigue value in a case where the mean velocity of pupil motion is greater than the moderate fatigue threshold value of the mean velocity of pupil motion and less than the severe fatigue threshold value of the mean velocity of pupil motion, assigning a fourth velocity numerical value to the first visual fatigue value in a case where the mean velocity of pupil motion is greater than the severe fatigue threshold value of the mean velocity of pupil motion, wherein the mild fatigue threshold value of the mean velocity of pupil motion is less than the moderate fatigue threshold value of the mean velocity of pupil motion, and the moderate fatigue threshold value of the mean velocity of pupil motion is less than the severe fatigue threshold value of the mean velocity of pupil motion;
    the acquiring the second visual fatigue value by comparing the mean angular velocity of pupil motion with the mean angular velocity threshold values of pupil motion comprises: assigning a first angular velocity numerical value to the second visual fatigue value in a case where the mean angular velocity of pupil motion is less than the mild fatigue threshold value of the mean angular velocity of pupil motion, assigning a second angular velocity numerical value to the second visual fatigue value in a case where the mean angular velocity of pupil motion is greater than the mild fatigue threshold value of the mean angular velocity of pupil motion and less than the moderate fatigue threshold value of the mean angular velocity of pupil motion, assigning a third angular velocity numerical value to the second visual fatigue value in a case where the mean angular velocity of pupil motion is greater than the moderate fatigue threshold value of the mean angular velocity of pupil motion and less than the severe fatigue threshold value of the mean angular velocity of pupil motion, assigning a fourth angular velocity numerical value to the second visual fatigue value in a case where the mean angular velocity of pupil motion is greater than the severe fatigue threshold value of the mean angular velocity of pupil motion, wherein the threshold value of mild fatigue of the mean angular velocity of pupil motion is less than the threshold value of moderate fatigue of the mean angular velocity of pupil motion, and the threshold value of moderate fatigue of the mean angular velocity of pupil motion is less than the threshold value of severe fatigue of the mean angular velocity of pupil motion;

the acquiring the third visual fatigue value by comparing the mean time duration of closing eyes with the mean time duration grade threshold values of closing eyes comprises: assigning a first time numerical value to the third visual fatigue value in a case where the mean time duration of closing eyes is less than the mild fatigue threshold value of the mean time duration of closing eyes, assigning a second time numerical value to the third visual fatigue value in a case where the mean time duration of closing eyes is greater than the mild fatigue threshold value of the mean time duration of closing eyes and less than the moderate fatigue threshold value of the mean time duration of closing eyes, assigning a third time numerical value to the third visual fatigue value in a case where the mean time duration of closing eyes is greater than the moderate fatigue threshold value of the mean time duration of closing eyes and less than the severe fatigue threshold value of the mean time duration of closing eyes, assigning a fourth time numerical value to the third visual fatigue value in a case where the mean time duration of closing eyes is greater than the severe fatigue threshold value of the mean time duration of closing eyes, wherein the mild fatigue threshold value of the mean time duration of closing eyes is less than the moderate fatigue threshold value of the mean time duration of closing eyes, and the moderate fatigue threshold value of the mean time duration of closing eyes is less than the severe fatigue threshold value of the mean time duration of closing eyes;

the acquiring the fourth visual fatigue value by comparing the mean blink frequency with grade threshold values of the mean blink frequency comprises: assigning a first frequency numerical value to the fourth visual fatigue value in a case where the mean blink frequency is less than the mild fatigue threshold value of the mean blink frequency, assigning a second frequency numerical value to the fourth visual fatigue value in a case where the mean blink frequency is greater than the mild fatigue threshold value of the mean blink frequency and less than the moderate fatigue threshold value of the mean blink frequency, assigning a third frequency numerical value to the fourth visual fatigue value in a case where the mean blink frequency is greater than the moderate fatigue threshold value of the mean blink frequency and less than the severe fatigue threshold value of the mean blink frequency, assigning a fourth frequency numerical value to the fourth visual fatigue value in a case where the mean blink frequency is greater than the severe fatigue threshold value of the mean blink frequency, wherein the mild fatigue threshold value of the mean blink frequency is less than the moderate fatigue threshold value of the mean blink frequency, and the moderate fatigue threshold value of the mean blink frequency is less than the severe fatigue threshold value of the mean blink frequency.

2. The method according to claim 1, further comprising:
pre-processing the eye image before acquiring the visual features from the eye image,
wherein the pre-processing the eye image comprises at least one of: increasing brightness of the eye image, increasing contrast of the eye image, or performing a denoising process on the eye image.

3. The method according to claim 1, wherein the calculating the visual fatigue value according to the visual features further comprises:
determining the visual fatigue value according to at least one of the first visual fatigue value, the second visual fatigue value, the third visual fatigue value, or the fourth visual fatigue value.

4. The method according to claim 3, wherein the fatigue grade threshold values comprise a mild fatigue threshold value, a moderate fatigue threshold value, and a severe fatigue threshold value; and
comparing the visual fatigue value with fatigue grade threshold values and determining the visual fatigue grade according to the comparison result comprises:
determining the visual fatigue grade to be a mild fatigue grade in a case where
the visual fatigue value is greater than or equal to the mild fatigue threshold value and less than the moderate fatigue threshold value;
determining the visual fatigue grade to be a moderate fatigue grade in a case where the visual fatigue value is greater than or equal to the moderate fatigue threshold value and less than the severe fatigue threshold value; and
determining the visual fatigue grade to be severe fatigue grade in a case where the visual fatigue value is greater than or equal to the severe fatigue threshold value.

5. The method according to claim 1, wherein the generating the corresponding alert signal based on the visual fatigue grade comprises:
generating an image flashing signal of a corresponding color and/or a vibration signal of a corresponding frequency according to the visual fatigue grade, so that a screen of the virtual reality apparatus displays an image of the corresponding color which flashes at a first preset frequency and/or, the virtual reality apparatus vibrates at a second preset frequency.

6. A virtual reality apparatus comprising a processor and a machine-readable storage medium, wherein
the machine-readable storage medium stores machine-executable instructions suitable for being executed by the processor, and
the visual fatigue recognition method according to claim 1 is executed in a case where the machine-executable instructions are executed by the processor.

7. A storage medium, non-transitorily storing computer readable instructions, wherein the visual fatigue recognition method according to claim 1 is performed in a case where the non-transitory computer readable instructions are executed by a computer.

8. A visual fatigue recognition device comprising:
a camera configured to acquire an eye image of a user;
a processor configured to acquire visual features from the eye image and to calculate a visual fatigue value according to the visual features; and further configured to compare the visual fatigue value with fatigue grade threshold values and to determine a visual fatigue grade according to the comparison result,
wherein the visual features comprise at least one of: a mean velocity of pupil motion, a mean angular velocity of pupil motion, a mean time duration of closing eyes, or a mean blink frequency;
correspondingly, the processor is configured to:
respectively acquire from successive frames of eye images at least one of: pupil positions, pupil areas, or blink counts;
calculate the mean velocity of pupil motion according to each of the pupil positions in a first preset time period;
calculate the mean angular velocity of pupil motion according to each of the pupil positions in a second preset time period;
calculate the mean time duration of closing eyes according to each of the pupil areas in a third preset time period; or
and further calculate the mean time duration of closing eyes according to the blink counts in a fourth preset time period;
wherein the processor is configured to:
acquire a first visual fatigue value by comparing the mean velocity of pupil motion with mean velocity grade threshold values of pupil motion;
acquire a second visual fatigue value by comparing the mean angular velocity of pupil motion with mean angular velocity threshold values of pupil motion;
acquire a third visual fatigue value by comparing the mean time duration of closing eyes with mean time duration grade threshold values of closing eyes;
acquire a fourth visual fatigue value by comparing the mean blink frequency with grade threshold values of the mean blink frequency; and
determine the visual fatigue value according to at least one of: the first visual fatigue value, the second visual fatigue value, the third visual fatigue value, or the fourth visual fatigue value.

9. The device according to claim 8, wherein the processor is further configured to generate a corresponding alert signal according to the visual fatigue grade.

10. The device according to claim 8, wherein the processor is further configured to increase brightness of the eye image, increase contrast of the eye image; and perform a denoising process on the eye image.

11. The device according to claim 8, wherein the mean velocity grade threshold values of pupil motion comprise a mild fatigue threshold value of the mean velocity of pupil motion, a moderate fatigue threshold value of the mean velocity of pupil motion, and a severe fatigue threshold value of the mean velocity of pupil motion; the mean angular velocity grade threshold values of pupil motion comprise a mild fatigue threshold value of the mean angular velocity of pupil motion, a moderate fatigue threshold value of the mean angular velocity of pupil motion, and a severe fatigue threshold value of the mean angular velocity of pupil motion; the mean time duration grade threshold values of closing eyes comprise a mild fatigue threshold value of the mean time duration of closing eyes, a moderate fatigue threshold value of the mean time duration of closing eyes, and a severe fatigue threshold value of the mean time duration of closing eyes; the grade threshold values of the mean blink frequency comprise a mild fatigue threshold value of the mean blink frequency, a moderate fatigue threshold value of the mean blink frequency, and a severe fatigue threshold value of the mean blink frequency;

the processor is configured to:
assign a first velocity numerical value to the first visual fatigue value in a case where the mean velocity of pupil motion is less than the mild fatigue threshold value of the mean velocity of pupil motion, to assign a second velocity numerical value to the first visual fatigue value in a case where the mean velocity of pupil motion is greater than the moderate fatigue threshold value of the mean velocity of pupil motion and less than the mild fatigue threshold value of the mean velocity of pupil motion, to assign a third velocity numerical value to the first visual fatigue value in a case where the mean velocity of pupil motion is greater than the moderate fatigue threshold value of the mean velocity of pupil motion and less than the severe fatigue threshold value of the mean velocity of pupil motion, and further to assign a fourth velocity numerical value to the first visual fatigue value in a case where the mean velocity of pupil motion is greater than the severe fatigue threshold value of the mean velocity of pupil motion, wherein the mild fatigue threshold value of the mean velocity of pupil motion is less than the moderate fatigue threshold value of the mean velocity of pupil motion, and the moderate fatigue threshold value of the mean velocity of pupil motion is less than the severe fatigue threshold value of the mean velocity of pupil;

assign a first angular velocity numerical value to the second visual fatigue value in a case where the mean angular velocity of pupil motion is less than the mild fatigue threshold value of the mean angular velocity of pupil motion, to assign a second angular velocity numerical value to the second visual fatigue value in a case where the mean angular velocity of pupil motion is greater than the mild fatigue threshold value of the mean angular velocity of pupil motion and less than the moderate fatigue threshold value of the mean angular velocity of pupil motion, to assign a third angular velocity numerical value to the second visual fatigue value in a case where the mean angular velocity of pupil motion is greater than the moderate fatigue threshold value of the mean angular velocity of pupil motion and less than the severe fatigue threshold value of the mean angular velocity of pupil motion, and further to assign a fourth angular velocity numerical value to the second visual fatigue value in a case where the mean angular velocity of pupil motion is greater than the severe fatigue threshold value of the mean angular velocity of pupil motion, wherein the threshold value of mild fatigue of the mean angular velocity of pupil motion is less than the threshold value of moderate fatigue of the mean angular velocity of pupil motion, and the threshold value of moderate fatigue of the mean angular velocity of pupil motion is less than the threshold value of severe fatigue of the mean angular velocity of pupil motion;

assign a first time numerical value to the third visual fatigue value in a case where the mean time duration of closing eyes is less than the mild fatigue threshold value of the mean time duration of closing eyes, to assign a second time numerical value to the third visual fatigue value in a case where the mean time duration of closing eyes is greater than the mild fatigue threshold value of the mean time duration of closing eyes and less than the moderate fatigue threshold value of the mean time duration of closing eyes, to assign a third time numerical value to the third visual fatigue value in a case where the mean time duration of closing eyes is greater than the moderate fatigue threshold value of the mean time duration of closing eyes and less than the severe fatigue threshold value of the mean time duration of closing eyes, and further to assign a fourth time numerical value to the third visual fatigue value in a case where the mean time duration of closing eyes is greater than the severe fatigue threshold value of the mean time duration of closing eyes, wherein the mild fatigue threshold value of the mean time duration of closing eyes is less than the moderate fatigue threshold value of the mean time duration of closing eyes, and the moderate fatigue threshold value of the mean time duration of closing eyes is less than the severe fatigue threshold value of the mean time duration of closing eyes;

and assign a first frequency numerical value to the fourth visual fatigue value in a case where the mean blink frequency is less than the mild fatigue threshold value of the mean blink frequency, to assign a second frequency numerical value to the fourth visual fatigue value in a case where the mean blink frequency is greater than the mild fatigue threshold value of the mean blink frequency and less than the moderate fatigue threshold value of the mean blink frequency, to assign a third frequency numerical value to the fourth visual fatigue value in a case where the mean blink frequency is greater than the moderate fatigue threshold value of the mean blink frequency and less than the severe fatigue threshold value of the mean blink frequency, and further to assign a fourth frequency numerical value to the fourth visual fatigue value in a case where the mean blink frequency is greater than the severe fatigue threshold value of the mean blink frequency, wherein the mild fatigue threshold value of the mean blink frequency is less than the moderate fatigue threshold value of the mean blink frequency, and the moderate fatigue threshold value of the mean blink frequency is less than the severe fatigue threshold value of the mean blink frequency.

12. The device according to claim 11, wherein the fatigue grade threshold values comprise a mild fatigue threshold value, a moderate fatigue threshold value, and a severe fatigue threshold value;

the processor is configured to:
- determine the visual fatigue grade to be a mild fatigue grade in a case where the visual fatigue value is greater than or equal to the mild fatigue threshold value and less than the moderate fatigue threshold value;
- determine the visual fatigue grade to be a moderate fatigue grade in a case where the visual fatigue value is greater than or equal to the moderate fatigue threshold value and less than the severe fatigue threshold value; and
- determine the visual fatigue grade to be severe fatigue grade in a case where the visual fatigue value is greater than or equal to the severe fatigue threshold value.

13. A virtual reality apparatus comprising the visual fatigue recognition device according to claim 8.

* * * * *